(12) United States Patent
Becker et al.

(10) Patent No.: US 7,415,481 B2
(45) Date of Patent: Aug. 19, 2008

(54) METHOD AND IMPLEMENTATION FOR REFERENCING OF DYNAMIC DATA WITHIN SPREADSHEET FORMULAS

(75) Inventors: Andrew J. Becker, Bellevue, WA (US); Charles D. Ellis, Seattle, WA (US); Joseph M. Chirilov, Kirkland, WA (US); Juha P. Niemisto, Mercer Island, WA (US); Matthew J. Androski, Bellevue, WA (US); Robert C. Collie, Kirkland, WA (US); Robert G. Hawking, Seattle, WA (US); Simon Peyton-Jones, Cambridge (GB); Weide Zhong, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 10/956,940

(22) Filed: Sep. 30, 2004

(65) Prior Publication Data

US 2006/0069696 A1    Mar. 30, 2006

(51) Int. Cl.
*G06F 7/00* (2006.01)
*G06F 17/00* (2006.01)
(52) U.S. Cl. ..................... 707/102; 715/212
(58) Field of Classification Search .............. 707/102; 715/504, 212
See application file for complete search history.

(56) References Cited

U.S. PATENT DOCUMENTS

| | | | | |
|---|---|---|---|---|
| 5,557,787 A | * | 9/1996 | Shin et al. | 707/102 |
| 5,603,021 A | * | 2/1997 | Spencer et al. | 707/4 |
| 6,460,059 B1 | * | 10/2002 | Wisniewski | 715/212 |
| 6,510,420 B1 | * | 1/2003 | Cessna et al. | 706/45 |
| 6,631,497 B1 | * | 10/2003 | Jamshidi et al. | 715/514 |
| 6,640,234 B1 | | 10/2003 | Coffen | |

(Continued)

FOREIGN PATENT DOCUMENTS

WO    03/098500 A1    11/2003

(Continued)

OTHER PUBLICATIONS

European Search Report, Feb. 4, 2008, 3 pages.

(Continued)

*Primary Examiner*—John Breene
*Assistant Examiner*—Joshua Bullock
(74) *Attorney, Agent, or Firm*—Merchant & Gould P.C.

(57) ABSTRACT

The present invention relates to a new type of structured name within a spreadsheet program that allows users to refer to tables, columns of data within tables, headers of tables, totals from tables, PivotTables®, and portions of PivotTable® data by the data's headers. Embodiments of the present invention comprise a method for referring to a set of data that comprises receiving one or more semantic designations, wherein the one or more semantic designations name a set of context information that describes one or more items of data in a data structure, automatically creating a structural reference, and associating the context information with the structural reference. Other embodiments of the present invention relate to an interaction with a user interface for displaying on a display device a structural reference to data in a spreadsheet that comprises receiving one or more semantic designations from the user that refer to one or more elements of the data structure, creating a structural reference to the elements of the data structure, and displaying the structural reference as a collection of the one or more semantic designations.

31 Claims, 9 Drawing Sheets

U.S. PATENT DOCUMENTS

| | | | |
|---|---|---|---|
| 6,757,867 B2* | 6/2004 | Bauchot et al. | 715/504 |
| 7,003,504 B1* | 2/2006 | Angus et al. | 707/1 |
| 7,058,631 B1* | 6/2006 | Pal | 707/10 |
| 7,089,261 B2* | 8/2006 | Hladik, Jr. | 707/102 |
| 7,120,866 B2* | 10/2006 | Kotler et al. | 715/209 |
| 7,139,745 B2* | 11/2006 | Nakamura et al. | 707/2 |
| 7,191,184 B2* | 3/2007 | Laborde et al. | 707/101 |
| 2008/0028288 A1* | 1/2008 | Vayssiere et al. | 715/219 |

OTHER PUBLICATIONS

Hernandez et al., "Method of Indicating Non-Resolved Data in a Spreadsheet Cell;" IP.Com No. IPCOM000064529D, Jul. 1, 1985, 2 pages.

\* cited by examiner

| Status | (All) | | | |
|---|---|---|---|---|
| Count of ID | Proposed Milestone | | | |
| Proposed PM | M1 | M2 | M3 | Grand Total |
| Allan Folting | 7 | 8 | 5 | 20 |
| Brandon Weber | 4 | 5 | 1 | 10 |
| Chad Rothschiller | 3 | 9 | 8 | 20 |
| Charlie Ellis | 1 | 4 | | 5 |
| Cordell Jones | | 6 | | 6 |
| Eric Patterson | 1 | 5 | 8 | 14 |
| Eric Vigesaa | 1 | 5 | 2 | 8 |
| Gitika Gupta | 7 | 5 | 4 | 16 |
| Howie Dickerman | 3 | 7 | 3 | 13 |
| Joseph Chirilov | 4 | 5 | 6 | 15 |
| Rob Collie | | 1 | 1 | 2 |
| Roy Simkhay | 1 | 6 | 4 | 11 |
| Sam Radakovitz | | 3 | 4 | 7 |
| Grand Total | 32 | 69 | 46 | 147 |

FIG. 6

| Status | (All) | | | |
|---|---|---|---|---|
| Count of ID | Proposed Milestone | | | |
| Proposed PM | M1 | M2 | M3 | Grand Total |
| Allan Folting | 7 | 8 | 5 | 20 |
| Brandon Weber | 4 | 5 | 1 | 10 |
| Chad Rothschiller | 3 | 9 | 8 | 20 |
| Charlie Ellis | 1 | 4 | | 5 |
| Cordell Jones | | 6 | | 6 |
| Eric Patterson | 1 | 5 | 8 | 14 |
| Eric Vigesaa | 1 | 5 | 2 | 8 |
| Gitika Gupta | 7 | 5 | 4 | 16 |
| Howie Dickerman | 3 | 7 | 3 | 13 |
| Joseph Chirilov | 4 | 5 | 6 | 15 |
| Rob Collie | | 1 | 1 | 2 |
| Roy Simkhay | 1 | 6 | 4 | 11 |
| Sam Radakovitz | | 3 | 4 | 7 |
| Grand Total | 32 | 69 | 46 | 147 |

| Status | (All) | | | |
|---|---|---|---|---|
| Count of ID | Proposed Milestone | | | |
| Proposed PM | M1 | M2 | M3 | Grand Total |
| Allan Folting | 7 | 8 | 5 | 20 |
| Brandon Weber | 4 | 5 | 1 | 10 |
| Chad Rothschiller | 3 | 9 | 8 | 20 |
| Charlie Ellis | 1 | 4 | | 5 |
| Cordell Jones | | 6 | | 6 |
| Eric Patterson | 1 | 5 | 8 | 14 |
| Eric Vigesaa | 1 | 5 | 2 | 8 |
| Gitika Gupta | 7 | 5 | 4 | 16 |
| Howie Dickerman | 3 | 7 | 3 | 13 |
| Joseph Chirilov | 4 | 5 | 6 | 15 |
| Rob Collie | | 1 | 1 | 2 |
| Roy Simkhay | 1 | 6 | 4 | 11 |
| Sam Radakovitz | | 3 | 4 | 7 |
| *Mike Young* | *3* | *1* | *4* | *8* |
| *Joe DeStasio* | *2* | *3* | *2* | *7* |
| *Greg Macdonald* | *1* | *2* | *5* | *8* |
| Grand Total | 38 | 75 | 57 | 170 |

FIG. 9

| Status | (All) | | | |
|---|---|---|---|---|
| Count of ID | Proposed Milestone | | | |
| Proposed PM | M1 | M2 | M3 | Grand Total |
| Allan Folting | 7 | 8 | 5 | 20 |
| Brandon Weber | 4 | 5 | 1 | 10 |
| Chad Rothschiller | 3 | 9 | 8 | 20 |
| Charlie Ellis | 1 | 4 | | 5 |
| Cordell Jones | | 6 | | 6 |
| Eric Patterson | 1 | 5 | 8 | 14 |
| Eric Vigesaa | 1 | 5 | 2 | 8 |
| Gitika Gupta | 7 | 5 | 4 | 16 |
| Howie Dickerman | 3 | 7 | 3 | 13 |
| Joseph Chirilov | 4 | 5 | 6 | 15 |
| Rob Collie | | 1 | 1 | 2 |
| Roy Simkhay | 1 | 6 | 4 | 11 |
| Sam Radakovitz | | 3 | 4 | 7 |
| *Mike Young* | *3* | *1* | *4* | *8* |
| *Joe DeStasio* | *2* | *3* | *2* | *7* |
| *Greg Macdonald* | *1* | *2* | *5* | *8* |
| Grand Total | 38 | 75 | 57 | 170 |

| Status | (All) | | | | |
|---|---|---|---|---|---|
| Count of ID | Proposed Milestone | | | | |
| Proposed PM | M1 | M1A | M2 | M3 | Grand Total |
| Allan Folting | 7 | 3 | 5 | 5 | 20 |
| Brandon Weber | 4 | 6 | 5 | 1 | 10 |
| Chad Rothschiller | 3 | 4 | 9 | 8 | 20 |
| Charlie Ellis | 1 | 6 | 4 | | 5 |
| Cordell Jones | | 3 | 6 | | 6 |
| Eric Patterson | 1 | 7 | 5 | 8 | 14 |
| Eric Vigesaa | 1 | 4 | 5 | 2 | 8 |
| *Mike Young* | 3 | 2 | 1 | 4 | 8 |
| *Joe DeStasio* | 2 | 2 | 3 | 2 | 7 |
| *Greg Macdonald* | 1 | 5 | 2 | 5 | 8 |
| Gitika Gupta | 7 | 7 | 5 | 4 | 16 |
| Howie Dickerman | 3 | 3 | 7 | 3 | 13 |
| Joseph Chirilov | 4 | 1 | 5 | 6 | 15 |
| Rob Collie | | 3 | 1 | 1 | 2 |
| Roy Simkhay | 1 | 4 | 6 | 4 | 11 |
| Sam Radakovitz | | 3 | 3 | 4 | 7 |
| Grand Total | 38 | 63 | 75 | 57 | 170 |

FIG. 10

| Status | (All) | | | | |
|---|---|---|---|---|---|
| Count of ID | Proposed Milestone | | | | |
| Proposed PM | M1 | M1A | M2 | M3 | Grand Total |
| Allan Folting | 7 | 3 | 5 | 5 | 20 |
| Brandon Weber | 4 | 6 | 5 | 1 | 10 |
| Chad Rothschiller | 3 | 4 | 9 | 8 | 20 |
| Charlie Ellis | 1 | 6 | 4 | | 5 |
| Cordell Jones | | 3 | 6 | | 6 |
| Eric Patterson | 1 | 7 | 5 | 8 | 14 |
| Eric Vigesaa | 1 | 4 | 5 | 2 | 8 |
| Mike Young | 3 | 2 | 1 | 4 | 8 |
| Joe DeStasio | 2 | 2 | 3 | 2 | 7 |
| Greg Macdonald | 1 | 5 | 2 | 5 | 8 |
| Gitika Gupta | 7 | 7 | 5 | 4 | 16 |
| Howie Dickerman | 3 | 3 | 7 | 3 | 13 |
| Joseph Chirilov | 4 | 1 | 5 | 6 | 15 |
| Rob Collie | | 3 | 1 | 1 | 2 |
| Roy Simkhay | 1 | 4 | 6 | 4 | 11 |
| Sam Radakovitz | | 3 | 3 | 4 | 7 |
| Grand Total | 38 | 63 | 75 | 57 | 170 |

FIG. 11

METHOD AND IMPLEMENTATION FOR REFERENCING OF DYNAMIC DATA WITHIN SPREADSHEET FORMULAS

TECHNICAL FIELD

The invention relates generally to the field of spreadsheet software or applications. More particularly, the invention relates to a naming conventions for referring to data and portions of data in cells and headers of tables and Microsoft® PivotTables®.

BACKGROUND OF THE INVENTION

Spreadsheet software or applications are relatively well-known and useful tools. Typical spreadsheet applications simulate physical spreadsheets by capturing, displaying, and manipulating data arranged in rows and columns. At the intersection of columns and rows are cells. Cells within spreadsheets can contain: a number, a string, an error value, or a blank value. Furthermore, cells may also contain formulas that can operate on data in other cells and display the results. These formulas empower the user to create calculations and business logic that helps the user exploit the data.

The formulas import data from areas in the spreadsheet. To import the data into the operation, spreadsheets commonly designate a set of data on which the formula will operate. Unfortunately, current spreadsheets applications have some significant drawbacks when it comes to designating blocks of data for use in formulas.

In current spreadsheets, the designation of data can be done in a few different ways. First, users can employ "references" to cell "ranges." A reference is a pointer to a set of data that uses the position, specified by the cell coordinates, of the data within the spreadsheet to designate the block of data. A cell range is one or more cells in a continuous block designated by its coordinates within the sheet. For example, in the Microsoft® Excel spreadsheet application, users may designate cells by the row number and the column letter. Users may designate a plurality of cells using an operator, like a colon, to indicate a range. The row numbers and column letters, with or without operators, function as the position coordinates for the data. Using a combination of row numbers, column letters, and operators, the user can designate a block of data within the spreadsheet. A typical formula in current spreadsheets might be "=AVERAGE(C6:C18)," which calculates the average of the data within a cell range from cell C6 to cell C18.

Next, users can employ a naming feature to refer to data having a "Name" or within a "Named Range." The naming feature in some spreadsheet applications, such as the Microsoft® Excel spreadsheet application, allows users to create a name for a particular cell range or formula. In essence, the user chooses a cell range with certain coordinates. The user instructs the spreadsheet application to "name" that cell range. The spreadsheet application then links the name to the cell range having the certain coordinates. Once the user has created the name for the cell range, the user may use the name within formulas to refer to the data having the certain coordinates. For instance, a user can create a name called "Heights" for the cell range C6 to C18, and use that name to designate the cell range within a formula, such as "=AVERAGE(Heights)."

Next, a user can employ an Natural Language Formula (NLF). NLFs are a means of referring to data by the user-created labels located in cells near the data within the spreadsheet. A user can place a data label into a spreadsheet, such as a column or row header. The user can then use the label within a formula. The spreadsheet application determines which cells, in the spreadsheet, are described by the label, and resolves the described cells into a cell range to use in the formula. Thus, if a user had the values "Height", "26", "30", "22", "27", etc. in cells C5:C18, the user could refer to "Height" within a formula. The spreadsheet application could resolve the required cell range to be cells C6 to C18.

Finally, a user can employ reference "functions." The reference functions are not references, but processes that return a reference to data or a specified piece of data. The operation of the process to return the reference is adjusted or changed according to a set of arguments a user may enter when inputting the function. The arguments allow the spreadsheet application to determine which cells to return.

Two examples of the functions that return references are the "OFFSET" function and the "GETPIVOTDATA" function, offered in the Microsoft® Excel spreadsheet application. The OFFSET function returns a reference to a range that is a specified number of rows and columns from a cell or range of cells. The returned reference from the OFFSET function can be a single cell or a range of cells. The OFFSET function allows the user to enter arguments that specify the number of rows and the number of columns to be returned.

The "GETPIVOTDATA" function, on the other hand, is intended to make it easier for the user to refer to a single cell of data in a PivotTable® table. The data returned from the GETPIVOTDATA function doesn't change when the data, upon which the PivotTable® table is based, is refreshed (updated to incorporate new data values). The GETPIVOTDATA function finds data in a single cell by using the metadata of the PivotTable® table. Metadata are the "names" of the "items" and "fields" that correspond to the data, as opposed to the coordinates of the data. An "item" is computer-generated label within the PivotTable table that is similar to a row header or column header in a table. A "field" is a computer-generated label that may incorporate and/or describe one or more items. The field is similar to a header in a table that covers several rows or columns of data. As an example of the GETPIVOTDATA function, the user can ask for the data related to the height of John in a PivotTable® table by typing in the formula: "=GETPIVOTDATA("Height",Sheet1!$A$3,"Person","John")" where "John" is an item in the field named "Person." The GETPIVOTDATA function formula allows the data in the PivotTable® table to move to different cells without destroying the returned reference because the returned reference is based on the metadata of the cell and not the cell's location.

Significant drawbacks exist for all of the above methods of designating data in spreadsheet applications. All of the above methods are incapable of adjusting the designations to include added data because each of the methods are unable to interpret the user's intention to include the added data into a designation. When the cell range containing the user's data changes due to the addition of new data, formulas using the above methods for designating data must be manually changed to reflect the cell range change. If the designations are not updated, errors are introduced because the formulas no longer includes the necessary cells of data.

For example, if the user desired to obtain the average of data currently in column C, the user may enter the formula "=AVERAGE(C6:C18)," where all the data in column C is located in cells C6 to C18. The user would expect the formula to return the average of the data in column C. Now, if the user, either manually or by some operation, added data to column C in cells C19 to C22, the user may still expect the entered formula to return the average of all data in column C. Unfortunately, the formula would not operate as the user expects because the cell range in the formula would still only average the data within the cells C6 to C18, and thus, leave out the data in cells C19 to C22. These situations require the user to manually change the coordinates of the cell ranges in the formulas because spreadsheet applications cannot determine whether the user's expectation is always to include the new data in the reference. Thus, the user must manually edit the formula to read "=AVERAGE(C6:C22)." This editing is difficult or impossible when the user has numerous formulas with data that changes frequently. All types of references currently available (including references to cells by their coordinates, named ranges, NLFs, and functions that return references) suffer from the inability to update the cell range.

Further, an additional drawback of the naming feature, described above, is that the user must manually create and maintain each "Named Range." For example, a user must first create a list of heights in cells C6 to C18 and then create a named range called "Heights," which designates the data. Unfortunately, when the user updates the data, for example, if the user adds data in cells C19 to C22, the user must manually update the named range to include all cells from C6 to C22.

Still further, NLFs help with the some of the problems with named ranges, but introduce other problems. NLFs are often ambiguous. If two labels, within the spreadsheet, have the same name or if a label may describe data in a column and a row, the NLF may designate a cell range that differs from what the user would expect. For example, the NLF reference may point to the other cell range with the second label or to the row of data rather than the column of data as the user expects.

In addition, the association between the label input by the user and the cell range selected by the spreadsheet application is inferred at the time that the NLF (and not the label or data) is created or altered. Thus, a label used in some NLFs may point to one cell range while the same label used in other NLFs may point to a totally different cell range. For example, if the user entered the formula "=AVERAGE(Heights)," where the label "Heights" was in cell C5 and data was located in cells C6 to C18 (with no data in cell C19), the user would expect the formula to return the average of the data in the column that begins with the word "Heights." Now, if the user, either manually or by some operation, added data to column C, in cells C19 to C22, the user may still expect "Heights" to refer to all data in the column that starts with "Heights." Unfortunately, the formula would not function as the user expects because the cell range in the formula would still only average the data within the cells C6 to C18, and thus, leave out the data in cells C19 to C22. However, if the user were to enter exactly the same formula in another cell after adding the data in cells C19 to C22, the user would average the data in cells C6 to C22. Thus, the user can have two formulas with NLFs that look exactly the same, but one would return the correct result (equivalent to "=AVERAGE(C6:C22)") while the other would result in an incorrect result (equivalent to "=AVERAGE(C6:C18)"). Thus, the user employing NLFs has the problem of not clearly knowing exactly what cells to which a formula refers.

Still further, functions that return references, like OFFSET and GETPIVOTDATA, have some other limitations. Functions that return references do not adjust to changes in the data in a spreadsheet. For instance, the functions that return references do not adjust when items are renamed or as items are moved. For example, a GETPIVOTTABLE function that returns a reference for the height of John in the following manner: "=GETPIVOTDATA("Height",Sheet1!$A$3,"Person","John")" will not update if you change the name of that person from "John" to "Fred."

Similarly, an OFFSET function may return a reference to a desired cell by finding a cell designated in the arguments and moving a number of rows and columns from the designated cell to the desired cell. If rows or columns are inserted or deleted between the designated cell and the desired cell or if the designated cell or the desired cell moves, the OFFSET function will return the incorrect reference. The OFFSET function cannot adjust the number of rows and columns moved in the spreadsheet to find the desired cell.

The GETPIVOTDATA function also can return a reference only to a single cell. For a user to refer to multiple cells, the user must enter many GETPIVOTDATA functions, which can be unwieldy. For example, the user may desire to average the data in column C of the results from a PivotTable® table. The data in column C may reside in cells C6 to C18. To use the GETPIVOTDATA function references that adjust if the data moves during a PivotTable® table refresh, the user must enter one GETPIVOTDATA function for every cell from C6 to C18. The user must create a string of arguments that might look like:

"=AVERAGE(GETPIVOTDATA("Height", Sheet1!$A$3,"Person","John"),

GETPIVOTDATA("Height",Sheet1!$A$3,"Person", "Pam"),

GETPIVOTDATA("Height",Sheet 1!$A$3,"Person", "Bill"),

GETPIVOTDATA("Height",Sheet1!$A$3,"Person", "Fred")."

The formulas using functions that return references become extremely long and dense as the amount of data referenced grows. Creating and editing these formulas with functions that return references is tedious and time-consuming due to the length of the formulas

SUMMARY OF THE INVENTION

The present invention relates to embodiments of systems and methods for referring to data using automatically created, meaningful references that update with changes to the data. The present invention spreadsheet has added the ability for users to explicitly specify a table within a spreadsheet. Specifying tables within a spreadsheet is described more fully in U.S. patent application Ser. No. 10/957,502 entitled "DESIGN OF SPREADSHEET FUNCTIONS FOR WORKING WITH TABLES OF DATA and filed on Sep. 30, 2004 and U.S. patent application No. 10/951,576 entitled "METHOD AND SYSTEM FOR MULTITHREAD PROCESSING OF SPREADSHEET CHAIN CALCULATIONS" which are incorporated by reference herein, in their entirety. The ability to specify a table or a PivotTable® table provide a basis for an explicit and clear, as opposed to an inferred and unexpected, mapping between labels (metadata) and data. The present invention uses the clear context and mapping as the basis for the referencing. In embodiments of the present invention, the references allow a user to reference one cell or an array of cells in a spreadsheet using the user-created context that describe the cells. For example, a user can reference an entire column of data by inputting the user-created column header name as the reference. The present invention can also provide for formulas and calculations using the references. In addition, the references can adapt to changes in the referenced data.

The present invention relates to a new type of structured name within a spreadsheet program that allows users to refer to tables, columns of data within tables, headers of tables, totals from tables, PivotTables®, and portions of PivotTable® data by the data's headers. Embodiments of the present invention comprise a method for referring to a set of data that comprises receiving one or more semantic designations, wherein the one or more semantic designations describe one or more items of data in a data structure, automatically creating a structural reference, and associating the semantic designation with the structural reference. Other embodiments of the present invention relate to an interaction with a user interface for displaying on a display device a reference to data in a spreadsheet that comprises receiving one or more semantic designations from the user that describe one or more elements of the data structure, creating a structural reference to the elements of the data structure, and displaying the structural reference as a collection of the one or more semantic designations.

In some embodiments, the semantic designations describe a list, a table, a field, a member, a column, a row, one or more cells, or a dimension. In other embodiments, the semantic designation includes one or more of a list name, a table name, a row name, a column name, a cell name, a row location, a cell location, a column location, or a data detail. In one embodiment, the semantic designation refers to one or more items of metadata.

In one embodiment the structural reference refers to a location of one or more items of data. In further embodiments, the location refers to a column, a row, or one or more cells. In other embodiments, the data structure is a structure element of a table identified by the semantic designation. In further embodiments, the type of structure element includes one or more of a list, a table, a field, a member, a column, a row, one or more cells, or a dimension. In some embodiments, the structural reference is an unbounded number of cells. In some embodiments, the structural reference is provided to the user as a collection of the one or more semantic designations used to establish the structural reference.

In some embodiments, the method further comprises receiving a change to the data included in one or more structural references and automatically adjusting the one or more structural references to maintain the reference to one or more items of pre-existing data. In further embodiments, the method further comprises automatically adjusting the one or more structural references to include added data that is part of the data structure described by the one or more semantic designations used to establish the one or more structural references.

In some embodiments, the structural reference is included in an application formula. In further embodiments, the application formula provided to the user has one or more semantic designations used to establish the structural reference.

In some embodiments, the user interface may receive an operation that employs a structural reference and display the operation with the collection of the one or more semantic designations referring to the structural reference, wherein the one or more semantic designations form a collection of arguments within the operation. In further embodiments, the user interface may receive one or more changes to one or more items of data referred to by the structural reference.

The structural reference is unambiguous. A user can construe, from a formula that contains a reference and the spreadsheet to which the reference refers, exactly which cells are being referenced. The structural reference is also consistent. Two formulas containing the same semantic designation will always evaluate that semantic designation to be the same structure or portion of the structure within the workbook. In addition, the structural reference is a reference not a function.

Thus, the structural reference can be used wherever other reference can be used, can be operated on as other references, can highlight referenced cells like other references, and can adjust like other references.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of presently preferred embodiments of the invention, and to the appended claims.

BRIEF DESCRIPTION OF THE DRAWINGS

FIG. 6 is an example of an embodiment of the present invention illustrating a spreadsheet according to the present invention.

FIG. 7 is an example of an embodiment of the present invention illustrating a spreadsheet with a structural reference according to the present invention.

FIG. 8 is an example of an embodiment of the present invention illustrating a spreadsheet with appended data according to the present invention.

FIG. 9 is an example of an embodiment of the present invention illustrating a dynamically updated structural reference according to the present invention.

FIG. 10 is an example of an embodiment of the present invention illustrating a spreadsheet with a changed structure due to an insertion of data according to the present invention.

FIG. 11 is an example of an embodiment of the present invention illustrating a spreadsheet with a dynamically updated structural reference according to the present invention.

DETAILED DESCRIPTION OF THE INVENTION

The present invention will now be described more fully hereinafter with reference to the accompanying drawings, in which embodiments of the invention are shown. This invention may however, be embodied in many different forms and should not be construed as limited to the embodiments set forth herein. Rather, these embodiments are provided and discussed in detail so that this disclosure will be thorough and complete and will fully convey the scope of the invention to those skilled in the art.

In general, embodiments of the present invention relate to a structured name syntax within spreadsheet programs that references data based on context instead of cell coordinates (i.e. "C6" or "D3:D12") or indices, yet is still a reference, as opposed to a function. Embodiments of the invention comprise the new structural reference for referring to an item of data, methods for creating the structural reference, and methods for implementing the structural reference.

The invention may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 1A:
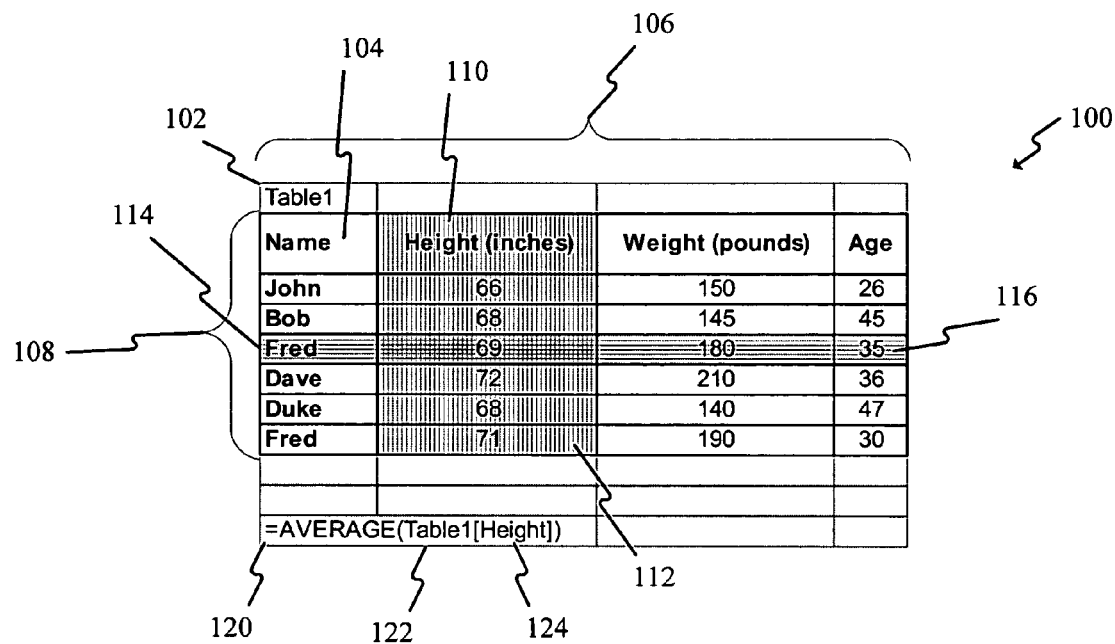
FIG. 1A and FIG. 1B are functional diagrams of embodiments of the present invention illustrating the functional relationship between structural references and formulas using the same.
Figure 1B:
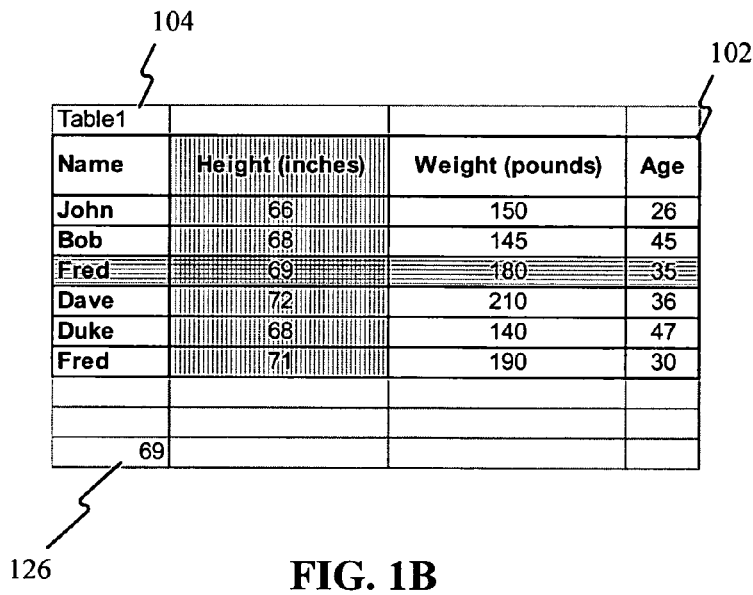

An embodiment of a spreadsheet application 100 having aspects of the present invention is shown in FIG. 1A and FIG. 1B. The exemplary spreadsheet 100 contains a table 102, with the name "Table1" 104. The table 102 has four columns 106 and seven rows 108. A user may create a structural reference to a data structure of the exemplary spreadsheet 100. A structured or structural reference is a reference to one or more data items in a spreadsheet that is based upon the structure of the spreadsheet data, such as the column, row, set of cells, or the like, rather than on a cell range. The structural reference may use the metadata of the structures, such as a column name, a row name, a data set name, or the like, to determine the structure of the reference. In some embodiments, the metadata may be user-created names such as table names, column header names, row header names, or the like.

A data structure refers to a set of data within a spreadsheet as described by the structural reference. Data structures may comprise columns, rows, tables, lists, separate spreadsheets, separate workbooks, members, PivotTables®, or portions of data defined by sets of rows or columns or the like. In embodiments of the present invention, a data structure contains a cell or an array of cells that occupies one of the above mentioned data structures. The array of cells in the data structure can be unbounded. In other words, the array of cells need not have a reference to two cells that bookend the beginning and the end of the array.

In embodiments of the present invention, the user can recite a semantic designation that helps a spreadsheet application identify a data structure. The spreadsheet application can create a structural reference to the data structure. In embodiments of the present invention, a semantic designation refers to the language descriptor input by a user that is the metadata name for a data structure, like a user-created column header name. Data structures are described more fully below. Context information refers to information the spreadsheet application can use to determine the data structure to which the structural reference shall apply. In embodiments of the present invention, the user-input semantic designations allow the spreadsheet application to produce a set of context information. The context information can be one or more semantic designations that describe one or more items of data. In embodiments of the invention, the context information is user-created, such as column header names or user-defined table names. In other embodiments, the context information may be provided, such as when a spreadsheet application designates a PivotTable® as "pivottable1" or "pivottable23." Thus, the semantic designation is the language descriptor provided to the spreadsheet application by the user, and the context information are the pieces of the spreadsheet, having the semantic designation as a name, that characterizes a data structure within the spreadsheet. Hereinafter, semantic designation and context information will be used almost interchangeably to describe the language descriptors, provided by the user or used by the spreadsheet application, that are used to identify data structures.

The present invention makes use of unambiguous metadata. In embodiments of the present invention, only Metadata, for which an unambiguous semantic designation can be determined is used in creating the structural reference. In addition, the nature and extent of the data, to which the reference refers, can be determined unambiguously based on the structures within the workbook, to which the reference refers, and the text of the semantic designations.

For example, referring to FIG. 1A, a user may want to use the data within column 112. The user could recite the semantic designation "Height." The spreadsheet application could find "Height" in the spreadsheet. The spreadsheet application could recognize that "Height" is a column header name 110 for column 112. Thus, "Height" is a piece of context information in the spreadsheet because "Height," as a column header name, describes the data in column 112. Column 112 is the data structure. Thus, if the user recites the semantic designation "Height" in a formula, the spreadsheet application determines that the user desires to use the data in column 112. The spreadsheet application can then create a structural reference to column 112, the data structure, such that the formula will use the data from column 112 in the calculation.

In embodiments of the present invention, a user can create structural references. Referring to FIG. 1A for example, using the semantic designation "Table1[Height]" creates a structural reference to the data in the column 112, as shown in the highlighted column 112. Using a semantic designation "Table1," which is the table name 104, can create a structural reference to the data structure of the entire table 102 shown in FIG. 1A. A semantic designation to "Table1[Fred]," which is the row header name 114, can create a structural reference to the data structure of the highlighted row 116 with "Fred" as a row header name 114. If a user wants to refer to a single cell of data, then the user can use semantic designations that point to the cell's row header name and column header name. The examples provided show the references placed in square brackets, like "[Fred]." Using the square brackets helps the spreadsheet application identify the input as a semantic designation having a related structural reference. The square brackets are only an exemplary syntax for use in spreadsheets. One skilled in the art will recognize that other types of syntax that may be used to identify the semantic designations and the related structural references.

A user can employ the structural reference in formulas. For instance, the user may enter a formula 120 in a spreadsheet, as shown in FIG. 1A. The formula 120 calculates an average. The entered formula 120 uses two semantic designations. First, the formula 120 uses the semantic designation "Table1," which refers to table 102, and "Height," which refers to column 112. The spreadsheet will find the context information related to the semantic designations to map the structural references to the data structures. One structural reference can map to table 102. The other structural reference can map to column 112. Thus, the formula 120 will calculate the average of all data within column 112, with the column header name "Height" 110, of table 102, labeled "Table1" 104. A result 126 from the calculation 120 of the average is shown in FIG. 1B. As this exemplary embodiment demonstrates, the user need not provide a cell range to refer to data within the spreadsheet. Rather, the user can employ the semantic designation in the spreadsheet to refer to data within the spreadsheet.

Additionally, embodiments of the present invention can refer to parts of a structure including the data, headers, totals, or subtotals of a structure individually or can refer to parts of the structure in conjunction with other parts of the data. Thus, in the one embodiment, a user may refer to just the total for a given column by using a special semantic designation. For example, a special semantic designation to refer to a "total" structure may be as follows: "=Table1[Height, [#Total]]". Here, the semantic designation for returning a total is differentiated from a column name through the use of a symbol (#) that indicates to the spreadsheet application that the designation is part of the structure and not a column name.

Figure 2:
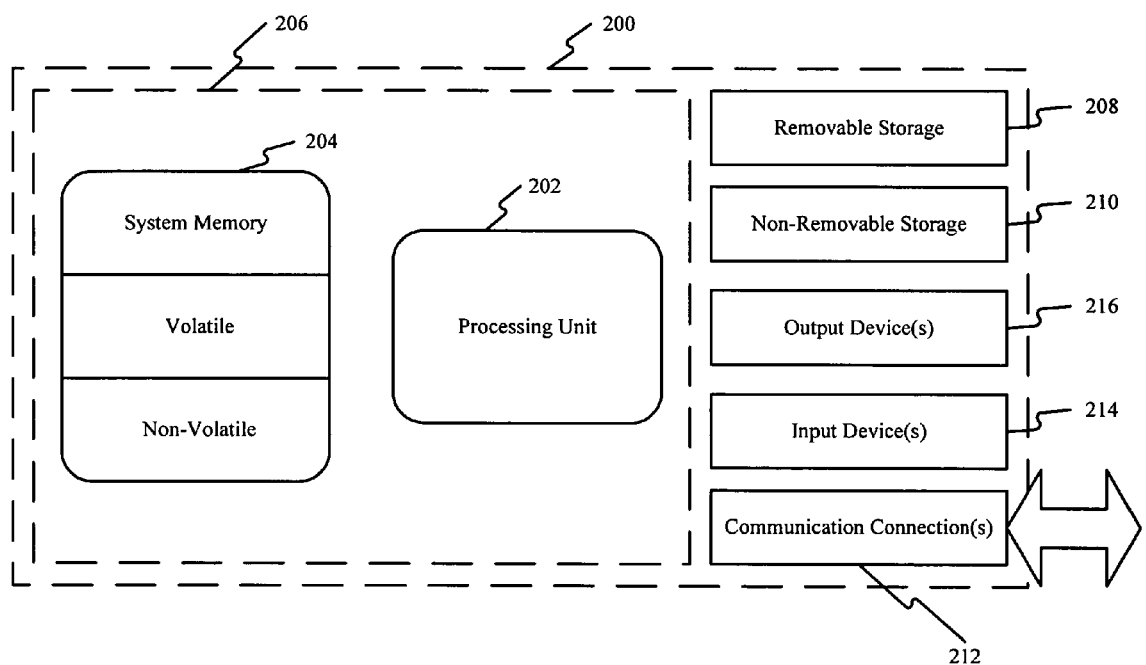
FIG. 2 is a functional diagram illustrating a computer environment and computing device operable to provide a structural reference according to the present invention.

An embodiment of a suitable operating environment in which the present invention may be implemented is shown in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary computing environment for implementing the embodiments of the present invention includes a computing device, such as computing device 200. In its most basic configuration, computing device 200 typically includes at least one processing unit 202 and memory 204. Depending on the exact configuration and type of computing device 200, memory 204 may be volatile (such as RAM), non-volatile (such as ROM, flash memory, etc.), or some combination of the two. This most basic configuration of the computing device 200 is illustrated in FIG. 2 by dashed line 206. Additionally, device 200 may also have additional features/functionality. For example, device 200 may also include additional storage (removable and/or non-removable) including, but not limited to, magnetic or optical disks or tape. Such additional storage is illustrated in FIG. 2 by removable storage 208 and non-removable storage 210. Such computer storage media includes volatile and nonvolatile, removable and non-removable media implemented in any method or technology for storage of information such as computer readable instructions, data structures, program modules, or other data. Memory 204, removable storage 208, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which can be used to store the desired information and which can be accessed by device 200 and processor 202. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. These devices, either individually or in combination can form the user interface 102. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media.

Figure 3:
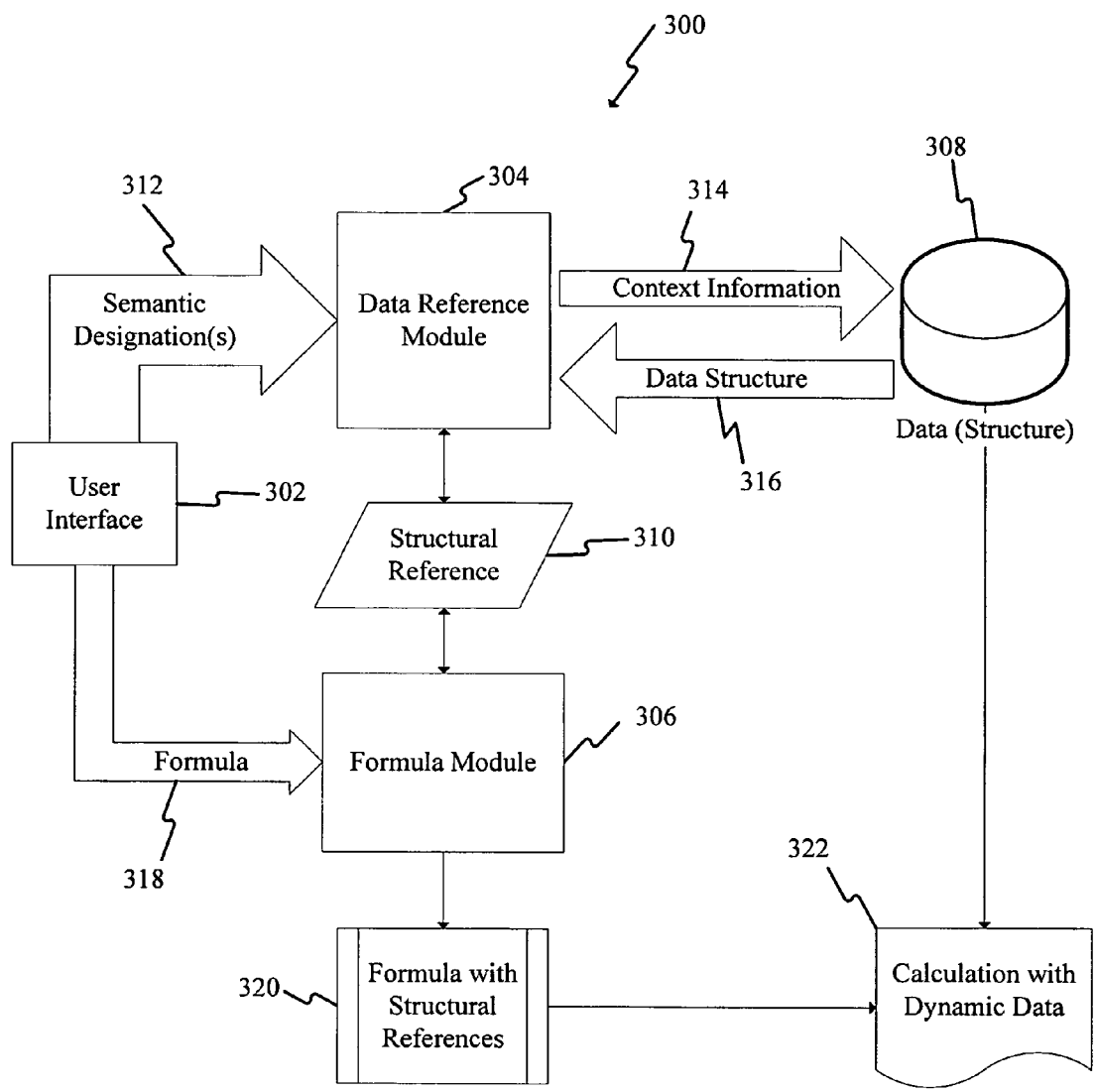
FIG. 3 is a flow diagram representing an embodiment of the present invention in associating a structural reference with a set of data within a spreadsheet according to the present invention.

A functional diagram of an embodiment of the system 300 having aspects of the present invention is shown in FIG. 3. The system 300 can create structural references according to one embodiment the present invention. The system 300 may be embodied as a portion of a software application, such as a spreadsheet or database application, or program. In an exemplary embodiment, portions of the system 300 are found in a spreadsheet application, such as the Microsoft® Excel spreadsheet application. The system application 300 has several modules. In an embodiment, the system 300 has a user interface 302, a data reference module 304, a formula module 306, and data 308 stored in some spreadsheet. In some embodiments, the various modules interact to create structural references 130 from semantic designations 332 provided by the user. The semantic designations can be associated with a set of context information 314 that can be used to identify a data structure 316 within the data 308. Once the data structure 316 is identified, the data reference module 304 can create the structural reference 130 to that data structure 316.

In some embodiments, the structural reference 130 may be used in a formula module 306. The formula module 306 can help manipulate the data 308 according to formula 318 received from the user. A formula 318 may use the structural reference 130 to obtain data that is used in the formula 318. The formula module 306 can output a formula with the structural references 320.

In embodiments of the present invention, structural references can be dynamically updated and changed. Thus, the structural references may reference "dynamic data." A dynamic data is a set of data within a data structure that can change but still be referenced with a structural reference. A structural reference can adapt or adjust to changes in the spreadsheet data or in the data structure. Often, users change, add, or delete data within the spreadsheet. In addition, users often manipulate the manner in which the spreadsheet data is presented. Structural references adapt to changes in the spreadsheet data because structural references point to data according to the context information (such as a semantic reference) rather than data's location information (such as a cell range). Thus, as the data or the data structure changes, the structural reference 130 can remap to data with a new data structure but the same context information, even if the data occupies a new location within the spreadsheet.

In embodiments of the present invention, the system 300 can apply the formula 320 to the data 308. A set of manipulated or calculated data 322 is created with the formula 320. The system produces the calculated data 322 with structural references, such that the data 308 can be dynamically updated. Thus, as the data 308 changes the formula will continue to produce the calculated data 322 according to the structural references.

Figure 4:
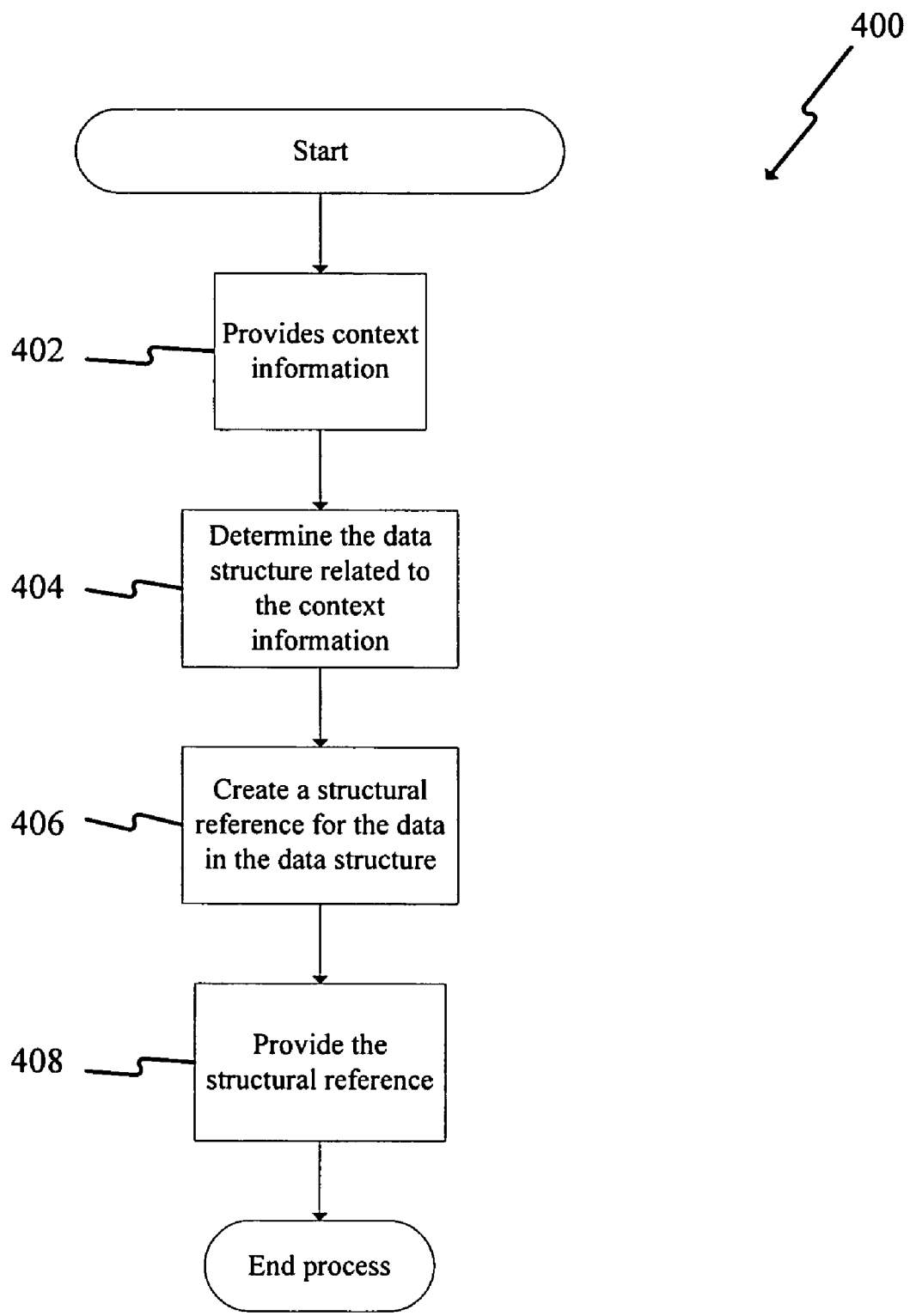
FIG. 4 is a flow diagram representing an embodiment of the present invention for dynamically updating a structural reference within a spreadsheet according to the present invention.

An embodiment of a method 400 for producing structural references is shown in the flow diagram of FIG. 4. In embodiments of the present invention, the method 400 begins as provide operation 402 provides one or more items of context information. Context information in this case may be similar to context information 314 shown in FIG. 3. The context information can refer to data by a data structure (such as data structure 316). In some embodiments, the user may provide one or more semantic designations (such as designations 312) through a user interface (such as 302). In some embodiments, the context information, as explained before, can be established from one or more semantic designations that point to all or a portion of the data using language descriptors that describe the data. In other embodiments, the user may provide context information through semi-selection or other processes explained further hereinafter. In yet other embodiments, other applications may provide such context information, e.g. a macrocode function may run in order to generate a report. In such a case, the spreadsheet application may create its own context information.

To provide input a semantic designation and thus create the context information, the user may employ several different methods. In one embodiment, the user may enter the semantic designations directly by typing the semantic designation into a spreadsheet application through a keyboard interface. In other embodiments, the user may select a row, column, table, or other structure with a mouse or other type of graphical user interface. Upon graphically selecting a set of data, the application can resolve which context information to use by determining the header names or other context information that describe the selected portion of the data and display the semantic designation for the selected data. This method may be referred to as semi-selection. In still other embodiments, the user may graphically copy a structural reference, from an existing formula or cell using a graphical user interface or other means, and paste the reference into a new formula or function. To copy the structural reference, the user can copy and paste the semantic designation. One skilled in the art will recognize other methods, in which a user may provide context information, that are included in the embodiments of the present invention.

Next. determine operation 404 determines the data structure related to the context information. In some embodiments, determining the data structure is dependent on the method that the user employed to provide the context information. If the user copied the semantic designations from another formula or cell, the structural references are also copied to the new formula or cell, as explained above. However, in some embodiments, the user may only provide the context information by typing in the semantic designations. In these embodiments, the application must determine what cells, columns, tables, lists, rows, or other structures are described by that context information. In embodiments of the present invention, the semantic designation always begins with the name of the data structure, such as "MyPivotTable," which would be the metadata title for the PivotTable® function named "MyPivotTable."

In embodiments of the present invention, the spreadsheet application parses the reference. Then, the spreadsheet application may determine whether the reference being parsed is a structure reference. If the reference is a structural reference, the spreadsheet application can determine which data structure has the name the user provided. For instance, the application may search a table or a list for a name either the same as or similar to the semantic designation. As an example, the user may provide the name "Height" in a formula, as in FIG. 1. A search of the table 102, in FIG. 1, will locate term "Height" in a column header 110. In the example, "Height" is the header 110 for the data in the column C 112.

Then, the spreadsheet application can determine what type of data structure the user named. For instance, the data structure may be a PivotTable® table, a table, or a list. In other embodiments, the data may be embedded within a data structure, such as those mentioned above. The spreadsheet application uses the structure (PivotTable table or table) to determine the context information lies in the spreadsheet compared to the data. If the context information is above the data, the context information may describe the data structure of a column. If the cell is to the left of the data, the context information may describe the data structure of a row. This process provides an unambiguous context for evaluating which cells contain the appropriate labels and what the extent is of the data referred to by a given label. The structure also updates, such that labels and data ranges remain linked In the above example, "Height" describes a column 112, the data structure, in the table 102 of FIG. 1 because it is the column header for that column. One skilled in the art will understand how the context information may be used to identify the data structure for tables.

In another embodiment, for PivotTable® tables, the spreadsheet application uses the name of the PivotTable® table and an intersection between items or ranges of items within fields to determine the extent of the structural reference. In one embodiment of the invention, the determination is done by semantically designating the name of the PivotTable® table, followed by square brackets that include the names of the items or ranges of items within fields, separated by columns.

An example of PivotTable® table may appear like the table in FIG. 6. A reference to the data in the column 610 for the item "M2" 602 from the field "Proposed Milestone" 614 is given by "=MyTable[[Proposed Milestone].[M2]]". Additionally, a reference to the intersection of this range of data with the row for the item "Joseph Chirilov" 616 in the field "Proposed PM" 618 would be given by "=MyTable[[Proposed Milestone].[M2], [Proposed PM].[Joseph Chirilov]]". An example of a reference that includes a range of items is a reference to the cells related to the items "Allan Folting" 602 to "Chad Rothschiller" 606 in the "Proposed PM" field 618 and the "M2" item 602 in the "Milestone" field 614. A structure reference to this set of cells would be "=MyTable[[Proposed Milestone].[M2], [Proposed PM].[Allan Folting]:[Chad Rothschiller]]". This reference will always result in the intersection of the data cells specified by the "M2" item 602 in the "Proposed Milestone" field 614 with the items from "Allan Folting" 602 to "Chad Rothschiller" 606 in the "Proposed PM" field 618, regardless of the order in which the items in the "Proposed PM" field 614 appear. The syntax used for the references is not limited to the syntax shown in the exemplary embodiments and examples. One skilled in the art will recognize other syntax that may be used for the references.

In another embodiment, for PivotTable® tables linked to data in an Online Analytical Processing (OLAP) database, the designation of a portion of the PivotTable® table uses an intersection of members or ranges of members within dimensions. Dimensions are captions or descriptors that describe an entire set of data. A dimension can have one or more members that further categorize and describe the set of data. The members can be organized into a set of levels where a member may be an ancestor to one or more "child" members. In embodiments of the present invention, the term ancestor, used in OLAP databases applies to a member that is the nth-parent of a specified member at any level in the hierarchy. Members and dimensions are well known in the art and will not be explained further. The semantic designation and related structural reference is similar to the designation of items within fields explained above, except that the reference may use a combination of dimension together with one or more members in one or more levels of the dimension as opposed to simply using the combination of one item and one field, as described above. In one embodiment, the structural reference to data in an OLAP PivotTable® table will include a single formulaic expression including all members, describing the data, in the dimension. For example, in the following OLAP PivotTable® table named "MyPivotTable":

| Count of OrderID ShipCountry | ShipCity | Total |
|---|---|---|
| Argentina | Buenos Aires | 34 |
| Brazil | Campinas | 19 |
|  | Resende | 19 |
|  | Rio de Janeiro | 83 |
|  | Sao Paulo | 82 |
| Mexico | México D.F. | 72 |
| Venezuela | Barquisimeto | 34 |
|  | Caracas | 4 |
|  | I. de Margarita | 35 |
|  | San Cristóbal | 45 | the semantic designation to the cell containing "83" would be:

"=MyPivotTable[[ShipCountry].[Brazil]. [Rio de Janeiro]]".

Embodiments of the present invention handle cases of ambiguity in OLAP PivotTable® tables by disambiguating duplicate member captions using an index. Thus, if two members with the same name and the same semantic designation in all other regards (same ancestors visible on the PivotTable® table and same dimension and level) appear on the table at the same time, these members are disambiguated for referencing purposes by an integer, which is appended to the member name in order to distinguish it from other members who would otherwise share the same designation. For example, one member may be "Vancouver 1," while a second member may be "Vancouver2."

Next, create operation 406 creates a structural reference. The structural reference can be based on the data structure determined above. In some embodiments, the spreadsheet application maps to the metadata of the data structure (i.e. to the headers and special items available in the structured referencing syntax). The metadata may include an embedded data structure, such as a column in a list or PivotTable®. Thus, the metadata may have context information for the table and the column. The structure reference is tied to the data structure. The spreadsheet application resolves the reference to a portion of a structure at "parse time" and then resolves the portion of a structure to a cell range at "evaluation time" for the feature. For example, the sematic designation "MyList [Sales]" will create a structural reference that is effectively "The Sales column of MyList" but this structural reference will be resolved to something like "cells C2 through C48" when the structural reference is used during the evaluation of a formula or a feature. Thus, the spreadsheet application can translate the semantic designation into a structural to a data structure at parse time, and translate the data structure into an actual range of cells with the data that the user wants at evaluation time. The user may not see the structural reference presented on the display device. However, in other embodiments, the user may be provided with either a textual or graphical representation, in a user interface, of the locations referenced by the structural reference. Thus, the user may receive, in some area or window of a display device, an indication that contains the cells that are included in the structural reference. For example, the cells may be highlighted in the spreadsheet application. In other embodiments, the spreadsheet application may change the appearance of a set of cells, displayed on a display device, by placing a border around the cells, shading the cells, or using some other visual effect.

Next, the provide operation 408 provides the structural reference. In embodiments of the present invention, the structural references are embedded into the spreadsheet for whatever operation the user wants to perform with the structural references. Yet, the user may only view the semantic designations in the spreadsheet. In some embodiments, the structural reference can by used to parse out a section of data or used in a formula, a calculation, or other data manipulation. In one embodiment, the semantic designations can be incorporated into the syntax of a formula as a set of arguments that provide the context information that create the structural references.

In another embodiment, the application can provide the structural reference to a display device. When the user enters the semantic designations manually, then the spreadsheet application may highlight the data structure referenced by the underlying structural reference. In other embodiments, where the user selected a section of data for use in some formula or function, the spreadsheet application can create semantic designations that describe the chosen data and provide those semantic designations to the user. One skilled in the art will recognize other ways the spreadsheet application may provide the structural reference to the user.

Figure 5:
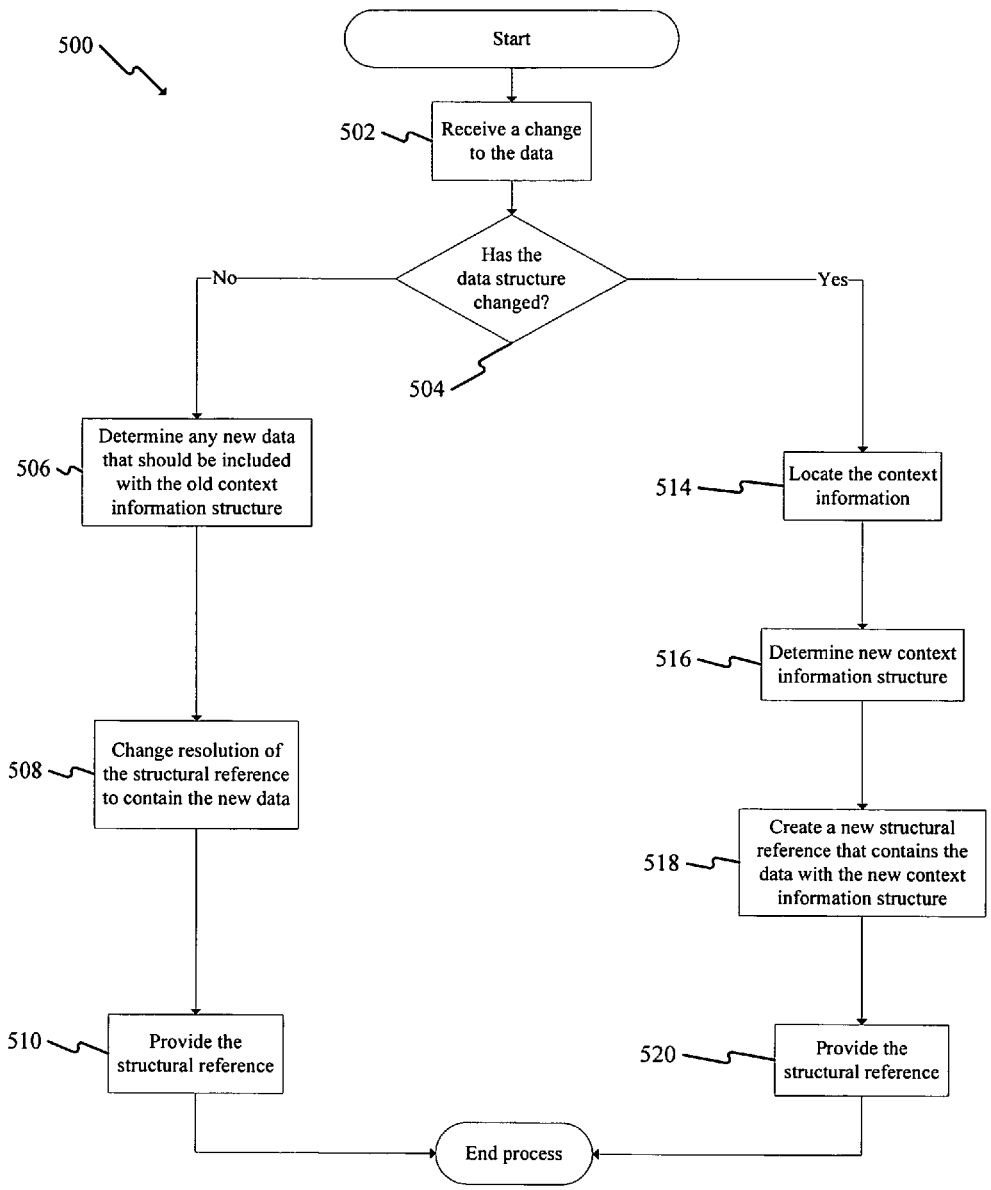
FIG. 5 is a flow diagram representing an embodiment of the present invention for applying a structured formula to a set of data within the spreadsheet according to the present invention.

A method 500 of dynamically updating data referenced by the structural references is shown in FIG. 5. A receive operation 502 receives changes to the data referenced by a structural reference. The changes may be to the data, such as adding more data, or to the data structure, such as inserting a row of data. For instance, data may be appended to the end of a column. Appending data does not necessarily change the existing data structure of the referenced data, in that the data already in the existing data structure has not moved. Appending data simply adds data to the existing data structure. In embodiments of the present invention, changes to the data structure may comprise inserting, deleting, or moving rows, columns, or cells in the existing data structure. The data structure changes can actually move the location of the data referenced in the structural reference. In some embodiments, changes occur because of some automatic function in the spreadsheet application, like a refresh of a PivotTable®, or manually through user intervention.

Next, determine operation 504 determines if the data structure changed. In some embodiments, the spreadsheet application determines whether a column, row, or cell was inserted into a field that moved or shifted the data referenced by the structural reference. The determination may include comparing the location of the structure change to the location of data referenced in existing structural references. If those locations overlap, then a change to the data structure has been made. One skilled in the art will recognize other ways the spreadsheet application may determine if a change to the structure occurred. If a change to the data structure has occurred, then a locate operation 514 locates the context information, which will be explained further below.

If a change to the data structure did not occur, as with the addition of data, then the determine operation 506 determines the effect on any existing structural references that the change may have had. For example, if data was added to a table, the application may determine if that data should be covered by an existing structural reference.

Next, change operation 508 changes a new structural reference. In embodiments of the present invention, the spreadsheet application changes the resolution of the structural references. For instance, an existing structural reference may resolve to obtain data in cells C2 through C6. The user may desire new data added to cells C7 through C9 to be included in the existing structural reference. The data structure referenced by the existing structural reference does not necessarily change, but the semantic designation used for the structural reference may encompass the newly added data. The spreadsheet application, rather than create a new structural reference, changes the resolution of the structural reference to now obtain data in cells C2 through C9. For example, if cells were added to the end of the column 112 in FIG. 1, then the resolution of the existing structural reference would need to cover those new cells in any formula using the semantic designation "Height."

Next, provision operation 510 provides the structural reference. In one embodiment, providing the structural reference may include dirtying any cells that use the structural reference. Dirtying cells may comprise identifying the cells, by setting a computer flag or by other means, which need to have the calculations or references in those cells rerun. The dirty cells have the operations in those cells rerun. In this way, as the structural reference updates, all operations using that reference also update. Thus, the spreadsheet application provides a structural reference to dynamic data because the structural references adjust to data changes and then update any operation using those structural references.

If the change to the data caused a change to the data structure, then find operation 514 finds the context information in the changed data structure. In embodiments of the present invention, the context information used to create a structural reference is stored. The context information is retrieved. In one embodiment, the spreadsheet application searches the spreadsheet or table for the context information, which may comprise one or more semantic designations. For instance, the spreadsheet application can search and find a column header having a column header name that is the same as a semantic designation.

Next, determine operation 516 determines the new data structure that applies to the context information. In one embodiment, upon finding the context information, the spreadsheet application can determine the data structure now associated with the context information. In some embodiments, the new data structure may be the same type of data structure, like a column, but may be located in another location. In other embodiments, the data structure type may change. For instance, data in a column may be displayed in a row after a data change.

Next, the create operation 518 creates a new structural reference. In one embodiment, the spreadsheet application remaps the structural reference to the new data structure. In other embodiments, the existing structural reference may be eliminated and a new structural reference produced.

Then, the provide operation 520 provides the new structural reference. In some embodiments, providing the new structural reference, as explained before, can include dirtying cells using the previous structural reference. The new structural reference replaces the previous structural reference in any formula or reference in the dirtied cells. Then, the operations in the dirtied cells are rerun using data obtained with the new structural reference. Thus, any calculations or operations using a structural reference dynamically update if any data referenced in those calculations or operations changes.

Exemplary embodiments of context information for structural references and the methods for creating and dynamically updating structural references are shown in FIG. 6 through FIG. 11. In the exemplary embodiments, a user has created a table 600. The table 600 has an array of data in rows and columns. The exemplary table 600 has context information that describes the data within the table 600. Again, context information is the set of user-created or automatically created names within the table 600 that can describe the data within the table 600. The context information can include a table name, a column header name, a row header name, or other such names.

First, the table 600 has the name "MyTable." The user-created name "MyTable" is a table name 601 that provides a first piece of context information. A user can use the semantic designation "MyTable" to reference data in table 600. The spreadsheet application can recognize this semantic designation as the context information that describes the data within table 600. Then, the spreadsheet application can create a structural reference to the table 600 based on the context information. When using the structural reference, the spreadsheet application can resolve the structural reference to the data within the table 600.

The table 600 also has other context information, such as row header names and column header names. Three exemplary row header names are shown in cells 602, 604, 606. An exemplary column header name, "M2," is shown in cell 608. A user could reference the data in column 610 using the semantic designation "M2." The spreadsheet application could create a structural reference to the data within column 610. When using the structural reference, the spreadsheet application could resolve the structural reference to the data within column 610. Box 612 shows what data may be used after the spreadsheet application resolves the structural reference.

An exemplary structural reference to a column of data within table 600 is shown in FIG. 7. "M2" is an exemplary semantic designation. "M2" is also the context information, column header name, for the column header 706. The column header identifies a data structure, column 708. Currently, the data in column 708 occupies an array of cells from cell C5 to cell C17, with a "Grand Total" in cell C18. A structural reference can be created that references the column 708 as a data structure. The structural reference can be stored with the context information, "M2." When using the structural reference, the spreadsheet application can resolve the data structure to include the data in cells C5 to C17, having the column header name "M2" 706. If the data changes, the spreadsheet application can use the stored context information to determine changes to the structural reference.

An example of an embodiment of the process to update a structural reference is shown in FIG. 8 and FIG. 9. Here, three new rows 802 of information are added to the table 800. The information did not change the location or data structure of any of the pre-existing data 1004 above the three new rows 1002. Now, the application must determine if the change may have an effect on any existing structural reference. As explained before, the user may have established a structural reference for all data under the header "M2" 906, as shown in FIG. 9. The structural reference to column 708 may have been affected by the added data. The spreadsheet application may then retrieve the context information that created the structural reference for the data under the column header "M2" 806. The data structure for the semantic designation "M2" 806 includes all data below the column header 806 to the Grand Total cell 1006. Thus, the data in the newly added rows 1002 should be included, as shown in the lightly shaded area 1102 of FIG. 11. Thus, the spreadsheet application now changes how to resolve the structural reference to cover both the new and existing data that is in the data structure 1104 delineated by the semantic designation "M2" 806.

An example of a situation where a change affects the data structure referenced by a structural reference is shown in FIG. 10 and FIG. 11. As explained before, the context information had a semantic designation to "M2" 706. The original structural reference referenced column 708, the data structure, shown as the set of highlighted cells in FIG. 10. Now, a column 1002 has been inserted into the table 1000 called "M1A." The column insertion changed the data structure because the column called "M2" 1004 moved to the right. Thus, the structural reference 708 now points to the wrong set of cells.

In addition, three rows 1006 were inserted into the middle of the table 1000. The new rows 1006 introduced new data into the column, shown by the box 1008, covered by the structural reference 708. Thus, the original structural reference 708 now covers the new data, in box 1008, and fails to cover some original data, shown in box 1012, in the last three rows 1010. The column and row additions have "broken" the original structural reference because, if the application continued to use the original structural reference, the original structural reference would provide incorrect data. Thus, the spreadsheet application must update the structural reference.

First, the spreadsheet application can locate again the context information. The spreadsheet application can locate the context information by searching the changed table 1000 for the previously stored, user-input semantic designation, "M2." In this example, the spreadsheet application would find "M2" in the column header 1102, as seen in FIG. 15. The location of the context information, "M2," is one column to the right of the original structural reference 1408. After locating the context information, the spreadsheet application can determine the new data structure that the context information describes. The context information "M2" refers to all the data 1104 in column 1106. Thus, the new data structure, column 1106, is as shown in the shaded areas 1104 of FIG. 11. The new data structure includes the new cells of data, in box 1110, and the original data, in box 1132. After the determining the new data structure, the spreadsheet application creates a new structural reference that references the metadata of column 1106. Thus, the process of creating the new structural reference adjusted the reference to compensate for the change in the data. In other words, the new structural reference adjusted to shift the reference to column 1106, add the data in box 1110, and to maintain a reference to the data in box 1112. The process was automatic and freed the user from having to make any manual changes to these structural references.

In embodiments of the present invention, the user may employ the above structural references in formulas or calculations. Any cells with an adjusted structural reference may be dirtied. Formulas and calculations occupying dirty cells may be rerun using the data obtained with the adjusted structural reference. Thus, the user's existing calculations and formulas are also automatically updated.

What is claimed is:

1. A method, executed in a computer system, for referring to a set of data within a spreadsheet application, comprising:
   receiving one or more semantic designations, wherein the one or more semantic designations describe one or more items of data in a data structure;
   automatically creating a structural reference to the data structure, wherein the structural reference is an unbounded number of cells;
   associating the one or more semantic designations with the structural reference, wherein associating the one or more semantic designations with the structural reference comprises at least one of the following:
      producing a set of context information from a user input semantic designation including a specified syntax, and
      employing the structural reference in at least one formula, wherein the spreadsheet application automatically maps the structural reference to the data structure;
   determining when context information in the spreadsheet is proximate the data;
   when context information is proximate the data, providing a context for evaluating which cells contain the data and which cells contain a data label and updating the structural reference wherein the label and data remained linked;
   when the data is stored in a database, determining ambiguity within the data, wherein the ambiguity arises because the one or more semantic designations contain duplicate captions;
   when ambiguity within the data is due to the one or more semantic designations containing duplicate captions, disambiguating the one or more semantic designations by use of a modifier, thereby creating a modified semantic designation;
   storing the association between the one or more semantic designations or the modified semantic designation and the structural reference.

2. The method according to claim 1, wherein the semantic designations describe one of a list, a table, a field, a member, a column, a row, one or more cells, or a dimension.

3. The method according to claim 1, wherein the semantic designations includes one or more of a list name, a table name, a row name, a column name, a cell name, a row location, a cell location, a column location, or a data detail.

4. The method according to claim 1, wherein the semantic designation describes one or more items of metadata.

5. The method according to claim 1, wherein the structural reference refers to a location of the data structure of the one or more items of data.

6. The method according to claim 5, wherein the location of the data structure is a position of a column, a row, or one or more cells.

7. The method according to claim 1, wherein the data structure is a structure element of a table identified by the semantic designation.

8. The method according to claim 7, wherein the type of structure element includes one or more of a list, a table, a field, a member, a column, a row, one or more cells, or a dimension.

9. The method according to claim 1, further comprising:
receiving a change to the data included in one or more structural references; and
automatically adjusting the one or more structural reference to maintain the reference to one or more items of pre-existing data.

10. The method according to claim 9, comprising automatically adjusting the one or more structural references to include added data that is part of the data structure described by the one or more semantic designations used to establish the one or more structural references.

11. The method according to claim 1, wherein the structural reference is provided to the user as a collection of the one or more semantic designations used to establish the structural reference.

12. The method according to claim 1, wherein the structural reference is included in an application formula.

13. The method according to claim 12, wherein the application formula is provided to the user having one or more arguments, wherein the one or more arguments include the one or more semantic designations used to establish the structural reference.

14. The method according to claim 1, wherein the structural reference is not created if one or more of the semantic designations is ambiguous.

15. The method according to claim 14, wherein the semantic designation is ambiguous if the semantic designation refers to two or more data structures.

16. A computer storage medium having computer-executable instructions stored thereon, the computer-executable instructions for performing a computer-executable method for referring to a set of data within a spreadsheet application, the method comprising:
receiving an application formula as input into the spreadsheet application, wherein the application formula includes one or more arguments;
receiving one or more semantic designations, wherein the one or more semantic designations describe one or more items of data in a first data structure, the one or more arguments of the application formula include the one or more semantic designations;
automatically creating a structural reference to the data structure;
associating the one or more semantic designations with the structural reference, wherein associating the one or more semantic designations with the structural reference comprises at least one of the following:
producing a set of context information from a user input semantic designation including a specified syntax, and
employing the structural reference in at least one formula, wherein the spreadsheet application automatically maps the structural reference to the data structure;
determining when context information in the spreadsheet is proximate the data;
when context information is proximate the data, providing a context for evaluating which cells contain the data and which cells contain a data label and updating the structural reference wherein the label and data remained linked;
when the data is stored in a database, determining ambiguity within the data, wherein the ambiguity arises because the one or more semantic designations contain duplicate captions;
when ambiguity within the data is due to the one or more semantic designations containing duplicate captions, disambiguating the one or more semantic designations by use of a modifier, thereby creating a modified semantic designation;
storing the association between the one or more semantic designations or the modified semantic designation and the structural reference;
receiving one or more changes to the one or more items of data;
determining a new data structure referred to by the one or more semantic designations, wherein the new data structure includes the one or more items of data and the one or more changes to the one or more items of data;
in response to determining a new data structure, automatically creating a new structural reference associated with the one or more semantic designations wherein the new structural reference includes the one or more items of data and the one or more changes to the one or more items of data in the new data structure retrieving one or more items of data from the new data structure referred to by the new structural reference;
executing the application formula with one or more items of data from the new data structure to create a result; and
displaying the result.

17. The computer storage medium according to claim 16, wherein the semantic designations describe one of a list, a table, a field, a member, a column, a row, one or more cells, or a dimension.

18. The computer storage medium according to claim 16, wherein the semantic designations includes one or more of a list name, a table name, a row name, a column name, a cell name, a row location, a cell location, a column location, or a data detail.

19. The computer storage medium according to claim 16, wherein the semantic designation describes one or more items of metadata.

20. The computer storage medium according to claim 16, wherein the structural reference refers to a location of the data structure of the one or more items of data.

21. The computer storage medium according to claim 20, wherein the location of the data structure is a position of a column, a row, or one or more cells.

22. The computer storage medium according to claim 16, wherein the data structure is a structure element of a table identified by the semantic designation.

23. The computer storage medium according to claim 22, wherein the type of structure element includes one or more of a list, a table, a field, a member, a column, a row, one or more cells, or a dimension.

24. The computer storage medium according to claim 16, wherein the structural reference is an unbounded number of cells.

25. The computer storage medium according to claim 16, further comprising:
receiving a change to the data included in one or more structural references; and
automatically adjusting the one or more structural reference to maintain the reference to one or more items of pre-existing data.

26. The computer storage medium according to claim 25, comprising automatically adjusting the one or more structural references to include added data that is part of the data structure described by the one or more semantic designations used to establish the one or more structural references.

27. The computer storage medium according to claim 16, wherein the structural reference is provided to the user as a collection of the one or more semantic designations used to establish the structural reference.

28. The computer storage medium according to claim 16, wherein the structural reference is not created if one or more of the semantic designations is ambiguous.

29. The computer storage medium according to claim 28, wherein the semantic designation is ambiguous if the semantic designation refers to two or more data structures.

30. A method executable in a computer system for displaying, on a display device, a reference to data in a spreadsheet, the method comprising:
   receiving one or more semantic designations from a user that describe one or more elements of a data structure;
   creating a structural reference, associated with the one or more semantic designations, to the elements of the data structure, wherein creating the structural reference to the elements of the data structure comprises at least one of the following:
      producing a set of context information from a user input semantic designation including a particular syntax, and
      employing the structural reference in at least one formula, wherein the spreadsheet application automatically maps the structural reference to the data structure;
   determining when context information in the spreadsheet is proximate the data;
   when context information is proximate the data, providing a context for evaluating which cells contain the data and which cells contain a data label and updating the structural reference wherein the label and data remained linked;
   when the data is stored in a database, determining ambiguity within the data, wherein the ambiguity arises because the one or more semantic designations contain duplicate captions;
   when ambiguity within the data is due to the one or more semantic designations containing duplicate captions, disambiguating the one or more semantic designations by use of a modifier, thereby creating a modified semantic designation;
   displaying, on the display device, the structural reference as a collection of the one or more semantic designations or the modified semantic designation;
   receiving one or more changes to the one or more elements of the data structure;
   creating a new structural reference; and
   displaying on the display device, the new structural reference as the collection of the one or more semantic designations.

31. The method according to claim 30, further comprising:
   receiving an operation that employs the structural reference; and
   displaying the operation with the collection of the one or more semantic designations referring to the structural reference, wherein the one or more semantic designations form a collection of arguments within the operation;
   displaying a result for the operation; and
   in response to creating the new structural reference, displaying a new result for the operation; and
   in response to creating the new structural reference, displaying the operation with the collection of the one or more semantic designations referring to the new structural reference.

* * * * *